UNITED STATES PATENT OFFICE.

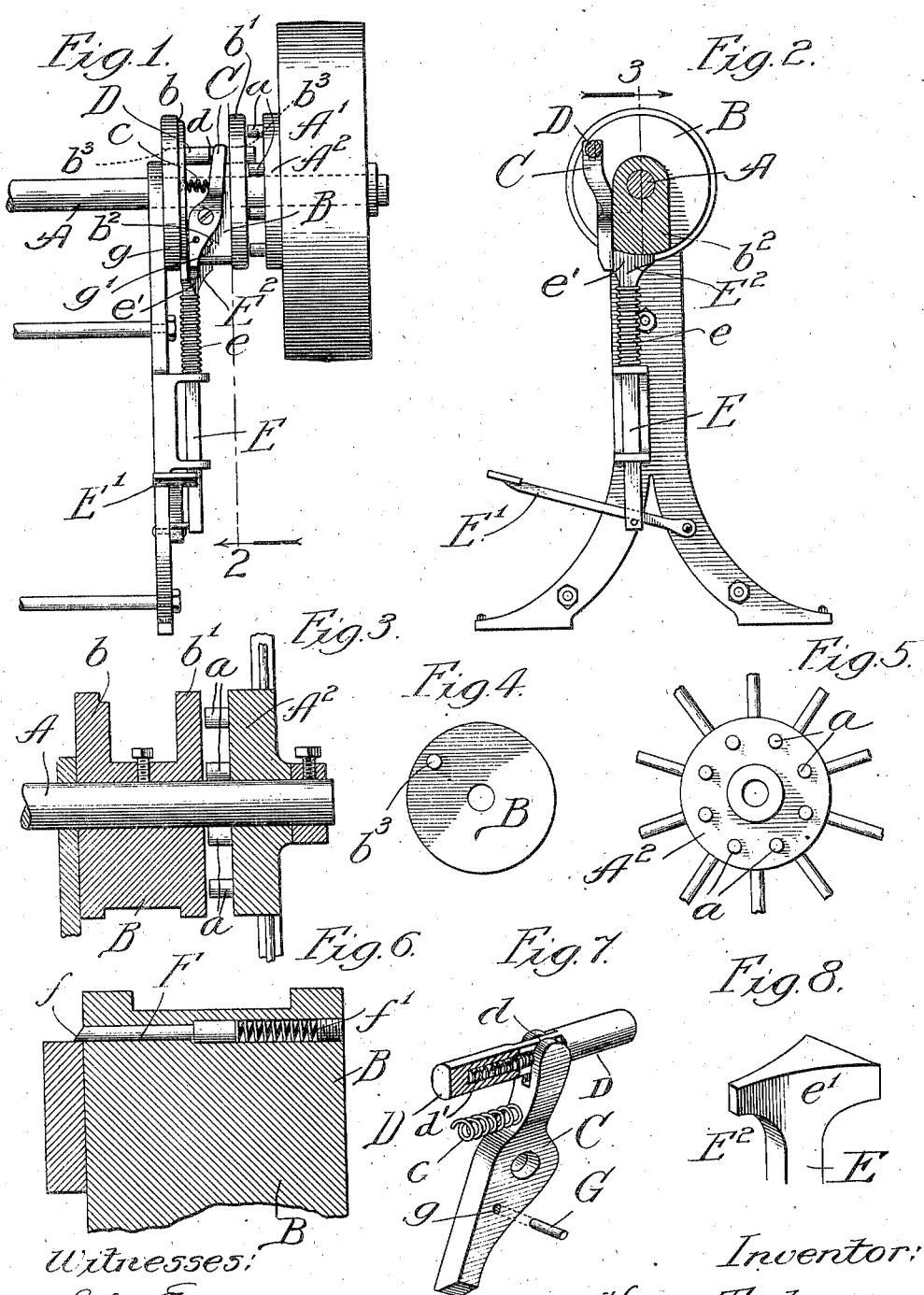

HENRY TSCHERNING, OF FREEPORT, ILLINOIS, ASSIGNOR TO ARCADE MANUFACTURING COMPANY, A CORPORATION OF ILLINOIS.

CLUTCH.

965,610.  Specification of Letters Patent.  Patented July 26, 1910.

Application filed May 6, 1908. Serial No. 431,122.

*To all whom it may concern:*

Be it known that I, HENRY TSCHERNING, a citizen of the United States, residing at Freeport, in the county of Stephenson and State of Illinois, have invented a new and useful Improvement in Clutches, of which the following is a specification.

My invention relates to certain new and useful improvements in clutches, and is fully described and explained in the specification and shown in the accompanying drawing, in which:

Figure 1 is a front elevation of my improved clutch; Fig. 2 is a section in the line 2 of Fig. 1; Fig. 3 is a section in the line 3 of Fig. 2; Fig. 4 is an elevation of one of the clutch members; Fig. 5 is an elevation of the other clutch member; Fig. 6 is a radial section showing the construction of the pawl, preventing backward-rotation of the clutch-controlled apparatus; Fig. 7 is a perspective view of the clutch operating lever and pin and Fig. 8 is a perspective view of the disengaging cam.

Referring to the drawing: A is a shaft upon which is loosely mounted a pulley $A^1$ adapted to be driven by a belt or other mechanism and fast to the pulley $A^1$ is a circular plate $A^2$ having a number of inwardly projecting pins $a$, the plate $A^2$ with its pins $a$ forming one clutch member. Fast on the shaft A is a clutch member B comprising two circular plates $b$, $b^1$ parallel to each other and connected by a central concentric boss which is radially extended at $b^2$ (Fig. 2), so as to make a radial web extending from the center of the clutch member substantially to its periphery, which said web forms a bearing for other parts. The entire construction of the clutch-member B will be readily understood from the drawings and it will also be at once apparent that the same can be made one integral casting as shown in the drawing, or if desired can be assembled from a number of parts bolted or otherwise secured together, such variations depending on the choice of the designer.

Pivoted to the web $b^2$ is a clutch operating lever C, of the first order, the upper end of which as viewed in Fig. 1 is spring-pressed to the right by means of the spring $c$. The upper end of the lever C is bifurcated and straddles a flattened portion $d$ on a longitudinally movable clutch-pin D guided in perforations $b^3$ provided to receive the same in the circular plates $b$, $b^1$ of the clutch member B. The flattened portion $d$ of the pin D is made somewhat longer than the upper end of the lever C and a spring $d^1$ is provided the same being let into a cavity in the rear end of the pin D and bearing against the upper end of the lever C, by means of which construction when the upper end of the lever C is swung to the right as viewed in Fig. 1 it will drive the pin positively forward, but when the lever is swung in the opposite direction it will draw the pin backward with a yielding motion, the power from the lever being transmitted through the spring $d^1$.

To the seat of the machine in which my clutch is incorporated is secured a vertically movable rod E under the control of the foot-lever $E^1$, the rod E being normally pressed upward by means of a spring $e$. The upper end of the rod E carries a cam $E^2$ having a beveled surface $e^1$ in position to engage the lower end of the lever C to force said end to the right as viewed in Fig. 1. When the foot-lever is drawn down, the lever will swing in the opposite direction under the influence of the spring $c$ as heretofore explained.

The operation of the device will now be readily apparent. The pulley $A^1$ with the clutch-member $A^2$ and pins $a$ thereon is of course normally in constant rotation under the influence of a driving belt or other power transmitting device. When the foot-lever is drawn down and with it the cam $E^2$, the lever C will rotate about its pivot so as to throw the upper end to the right as viewed in Fig. 1, whereby the pin D will move to the right and engage the pins $a$ on the clutch-member $A^2$, thereby producing engagement between the two clutch-members and causing rotation of the shaft A. When it is desired to stop the rotation of the shaft A, the foot-lever is released and the cam $E^2$ moves upward to the position shown in Fig. 1. Continuing rotation of the parts will cause the lower end of the lever C to engage said cam thereby rotating said lever in a direction to retract the pin D and disengage the clutch-members. This will permit the shaft A to come to rest and the cam $E^2$ will act as a brake thereby arresting the movement of the shaft so that it will at all times stop in substantially the same position.

In order to prevent reverse rotation of the shaft A, a movable pin F is let into the clutch-member B as seen in Fig. 6, the said pin having a beveled end $f$ adapted to engage the frame of the machine when moving in one direction, but to slide over the frame easily when moving in the other direction. The said pin F is spring-pressed by means of a spring $f^1$ to permit it to move backward under the influence of the working action of the frame when moving in the proper direction.

In order to provide for the disengagement of the clutch-members when it is desired to turn over the machine by hand, a pin G is provided which can be thrust into perforations $g$, $g^1$ on the lever C and the clutch-member B respectively when the lever is in disengaging position. It will be readily understood that these perforations are always in registration when the device is at rest by reason of the fact that the cam has so operated upon the lever as to bring it to disengaging position. When, therefore, it is desired to turn over the machine by hand, the pin can be merely inserted in the perforations which are then in registration, the foot-lever pressed down and the parts moved as desired.

I realize that considerable variation is possible in the details of construction of my improved device, without departing from the spirit of my invention, and I do not intend therefore, to limit myself to the specific form herein shown and described.

What I claim as new and desire to secure by Letters Patent, is—

The combination with a driving member and a series of pins thereon, of a driven member provided with a longitudinally movable pin, a lever on the driven-member having engagement with said pin to move the same into engaging position, a spring interposed between the lever and the pin, whereby on withdrawal of the pin, the spring will cause backward movement of the pin beyond the stroke of the lever, and a non-rotating cam adapted to be moved into and out of the path of the lever to engage the same, for the purpose set forth.

HENRY TSCHERNING.

In presence of—
S. L. MUNN, Jr.,
C. F. PIPER.